Aug. 21, 1945.  R. B. WALDER  2,383,094
AIR CHUCK
Filed Aug. 30, 1943
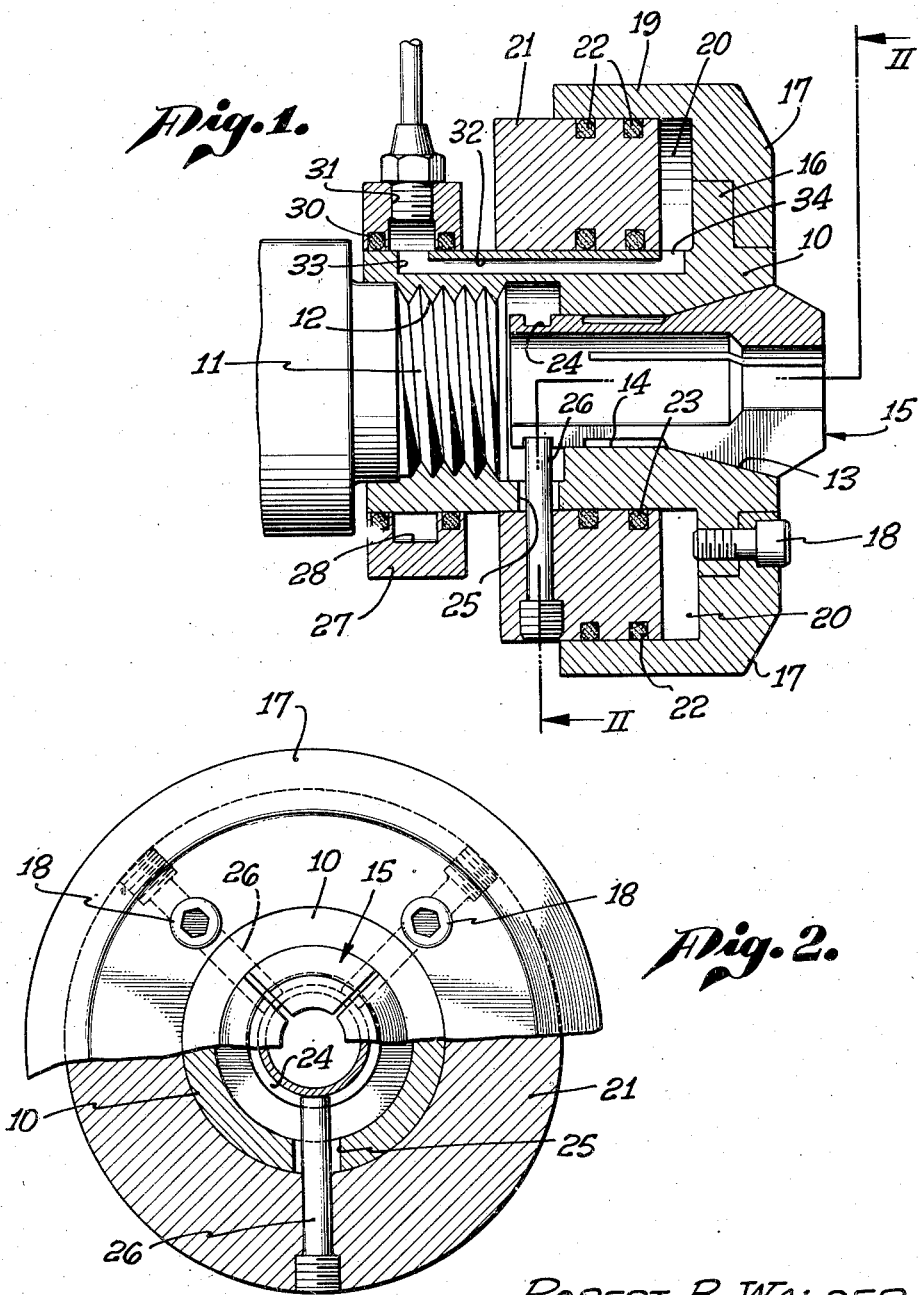
ROBERT B. WALDER,
INVENTOR.
BY
ATTORNEY.

Patented Aug. 21, 1945

2,383,094

UNITED STATES PATENT OFFICE 2,383,094

AIR CHUCK

Robert B. Walder, Los Angeles, Calif.

Application August 30, 1943, Serial No. 500,474

3 Claims. (Cl. 279—4)

This invention pertains to a fluid pressure-actuated chuck adapted for use on engine and turret lathes, boring machines, drill presses, polishing heads, etc.

A great deal of time is ordinarily consumed in inserting work into chucks of various machines of the character referred to hereinabove. The present invention facilitates and expedites operation in that the collet is automatically opened or clamped by means of fluid pressure. Moreover, the collet itself is free floating and will not score even the softest bar stock inserted therein. Precise and accurate control of clamping pressure may be attained. Moreover, supply of pressure fluid to the actuating mechanism is through the chuck body and does not in any way interfere with the advance through the collet. The capacity of the collet or the spindle is not interfered with.

Generally stated, the invention pertains to a fluid pressure-actuated chuck including a hollow, cylindrical chuck body provided with a plurality of longitudinally extending or axially, radially spaced passageways, such chuck body carrying an annular cylinder and a piston operable therein. The cylinder and piston rotate with the chuck. The outer portion of the bore in the chuck body is tapered to receive a tapered collet. Means are provided for translating the motion of the piston into clamping and unclamping motion of the collet.

A feeder ring including a channel open to the chuck body is mounted for rotation about the chuck body and ports in the chuck body communicate the feeder ring with the passageways and said passageways with the cylinder. A suitable valve, such as the foot valve, electrical or magnetic valve, controls the supply of pressure fluid through the feeder ring into the actuating cylinder. As a result, the fluid-actuated chuck of this invention is instantaneous in its operation and is particularly adapted to full automatic machines making use of mechanical or electrical sequence valving.

An object of the present invention, therefore, is to disclose and provide a simple, efficient, fluid pressure-actuated chuck.

Another object is to disclose and provide a fluid pressure-actuated chuck which is characterized by relative absence of parts subject to wear.

A further object is to provide a fluid pressure-actuated chuck which does not interfere with full spindle or collet capacity.

A still further object is to disclose and provide an improved construction for a fluid pressure-actuated chuck.

These and other objects and advantages of the invention will become apparent to those skilled in the art from the following detailed description of an exemplary form in which the invention is embodied. For purposes of illustration, reference will be had to the appended drawing, in which:

Fig. 1 is a longitudinal section of the chuck.

Fig. 2 is a front elevation, partly in section, taken along the plane II—II of Fig. 1.

As shown in this drawing, the device includes a hollow, cylindrical chuck body 10 provided with means for attachment to a driving spindle 11 at one end. Such means may comprise the internal threads indicated at 12. The outer end of the chuck body may be provided with an outwardly tapered collet-receiving bore, such bore comprising the outwardly tapered portion 13 and the cylindrical bore 14. A split collet is indicated at 15. A nose piece may be carried by the chuck body, said nose piece being adapted to form an annular cylinder around the axis of the chuck. The chuck body 10 may, for example, be provided with an outwardly extending flange or lip 16 to which the nose piece 17 is connected as by means of the cap screws 18. The cap screws 18 are preferably of the socket type. The nose piece 17 includes an outer cylindrical portion 19 which is spaced from the outer surface of the chuck body 10 so as to form a cylinder indicated at 20. Axially movable along the chuck body 10 and slidably movable within the cylinder 20 is a cylindrical piston 21 which may be provided with gasketing rings 22 and 23 made of any suitable material.

It will be noticed that the collet 15 is provided with a circumferential race 24. The chuck body 10 may be provided with a plurality of radially extending ports 25 and a stud or pin 26 may extend through each of the ports 25, the ends of such studs or pins being slidable within the race 24. The studs or pins 26 are firmly mounted in the cylindrical piston 21.

A feeder ring 27 is mounted for rotation upon the chuck body 10. The feeder ring 27 is preferably provided with a channel 28 open to the outer surface of the chuck body. Gasketing rings 30 are provided to assure a thorough seal between the feeder ring and the chuck body. An internally threaded bore 31 is provided in the feeder ring 27 so as to permit fluid pressure from a suitably valved source to be supplied to the channel 28 of the feeder ring 27.

The body 10 of the chuck is also provided with a plurality of longitudinally extending, circumferentially spaced passageways 32 which communicate as by ports 33 and 34 with the feeder ring and the cylinder 20.

The operation of the device will be readily understood. Any suitable fluid under pressure is supplied through a conduit connected to the tapped bore 31 and while the chuck body 10 is rotating, fluid pressure will be supplied from the feeder ring 27 to the various passageways 32 and to the cylinder 20. Variations in pressure of the pressure fluid may be caused to move the piston 21 either toward or away from the nose of the chuck. The collet 15 is caused to clamp down upon the work inserted into the collet by admitting fluid at a desirably high pressure into the cylinder 20, thereby causing the piston 21 to move toward the left (away from the nose), this motion being translated by the studs or pins 26 into a slight axial movement of the collet. The outwardly tapering seat 13, against which the jaws of the collet bear, causes such jaws to firmly grasp the work introduced into the collet. It is to be understood that the collet is provided with jaws which are most readily made by simply slitting one end of the collet. A dynamic piston pressure is thus uniformly applied to the work inserted into the collet. Moreover, it is to be noted that the collet is freely floated within the chuck; it is not keyed to the chuck as is the usual case with collets. The collet is therefore driven simply by the frictional and pressure contact between the collet and the outwardly tapering collet seat 13.

The flow of pressure to the feeder ring 21 may be controlled either manually, by a valve operated by a foot pedal, or by automatic valves. Either air or liquid may be used as the fluid. Although the drawing specifically refers to a chuck body which is internally threaded so as to seat directly upon a spindle, it is to be understood that the entire chuck assembly may be attached to an adapter which in turn is attached to the spindle.

The feeder ring 27 may be prevented from unnecessary movement longitudinally of the cylindrical body of the chuck in any suitable manner. For example, the conduit which supplies pressure fluid to the feeder ring may act as a holding device to hold the feeder ring in desired position above the ports 33, or snap rings may be placed upon the chuck body to hold the feeder ring in proper position.

A number of other modifications and changes may be embodied in this device. In some instances it is deemed desirable to attach to the chuck body 10 an upstanding lip or flange between the feeder ring 27 and the piston 21, this flange rotating with the chuck body. Three or more compression springs may then be placed between such upstanding body and the piston 21 so that when the supply of pressure fluid to the cylinder 20 is discontinued by operation of a suitable valve, the springs will positively force the piston 21 toward the right, thereby positively liberating the work-holding means such as the collet 15. Said springs are, of course, compressed whenever fluid under pressure is admitted to the cylinder 20.

Moreover, although the form of collet shown in the drawing is deemed to be novel, other forms of work-holding means may be mounted upon the chuck. At all events, the device is provided with means for translating the movement of the piston 21 into clamping action of the work-holding means.

Those skilled in the art will appreciate the numerous advantages and uses of the device described as well as the many modifications and changes which may be made without departing from the spirit of the invention defined in the appended claims.

I claim:

1. In a fluid pressure-actuated chuck: a hollow cylindrical chuck body provided with means for attachment to a driving spindle at one end and an outwardly tapered collet-receiving bore at the other; a nose piece carried by the chuck body, said nose piece including an outer cylindrical portion spaced from the outer surface of the chuck body; a cylindrical piston carried by and in slidable contact with the chuck body and the outer portion of the nose piece; a feeder ring rotatably carried by the chuck body; means for supplying pressure fluid to the feeder ring; an axial passageway in the chuck body provided with a radial port in communication with the feeder ring and a radial port in communication with the space between the piston and the nose piece; a collet within the chuck body, said collet being provided with a circumferentially extending race; a plurality of radial ports in the chuck body opposite said race; and pins carried by the piston and extending inwardly through said ports into said collet race, whereby said collet may be opened and closed in response to fluid pressure supplied to the feeder ring and the movement of the piston resulting therefrom.

2. A fluid pressure actuated chuck for attachment as a unit to the end of a spindle comprising a hollow body having one end adapted to engage the spindle and having an aperture at the other end, a passageway in the body wall and a radial port at each end of the passage, an axially stationary, annularly recessed feeder ring surrounding the body in rotating relation thereto and communicating with the port at one end of the passageway, a cylindrical element attached to the apertured end of the body forming an annular cylindrical space therewith open at one end, an annular piston longitudinally slidable in said space and adapted to close the cylindrical space and forming a closed pocket communicating with the port at the other end of the passageway, a plurality of circumferentially spaced openings extending radially through the body, a loose fitting pin extending from the piston through each opening and a collet having a portion received in the body aperture and a shank having an annular exterior race adapted to receive the pins whereby movement of the piston under pressure relative to the body is translated to movement of the collet relative to the body.

3. A fluid pressure-actuated chuck for attachment as a unit to the end of a spindle comprising a hollow body having one end adapted to engage the spindle and having an inwardly tapered aperture at the other end, a longitudinal passageway in the body wall and a radial port at each end of the passage, an axially stationary, annularly recessed feeder ring surrounding the body in rotating relation thereto and communicating with the port at one end of the passageway, a cylindrical element attached to the tapered end of the body forming an annular cylindrical space therewith open at one end, an annular piston longitudinally slidable in said space and adapted to close the cylindrical space and forming a closed pocket communicating with the port at the other end of the passageway, a plurality of circumferentially spaced openings extending radially through the body intermediate the ports at opposite ends of the passageway, a loose fitting pin extending from the piston through each opening and a spring collet having a tapered portion received in the tapered body aperture and a shank having an annular exterior race adjacent the free end adapted to receive the ends of the pins whereby movement of the piston under pressure relative to the body is translated to movement of the collet relative to the body.

ROBERT B. WALDER.